Sept. 21, 1948.　　　R. O. EDEL ET AL　　　2,449,887
COLLET CHUCK
Filed Sept. 16, 1946
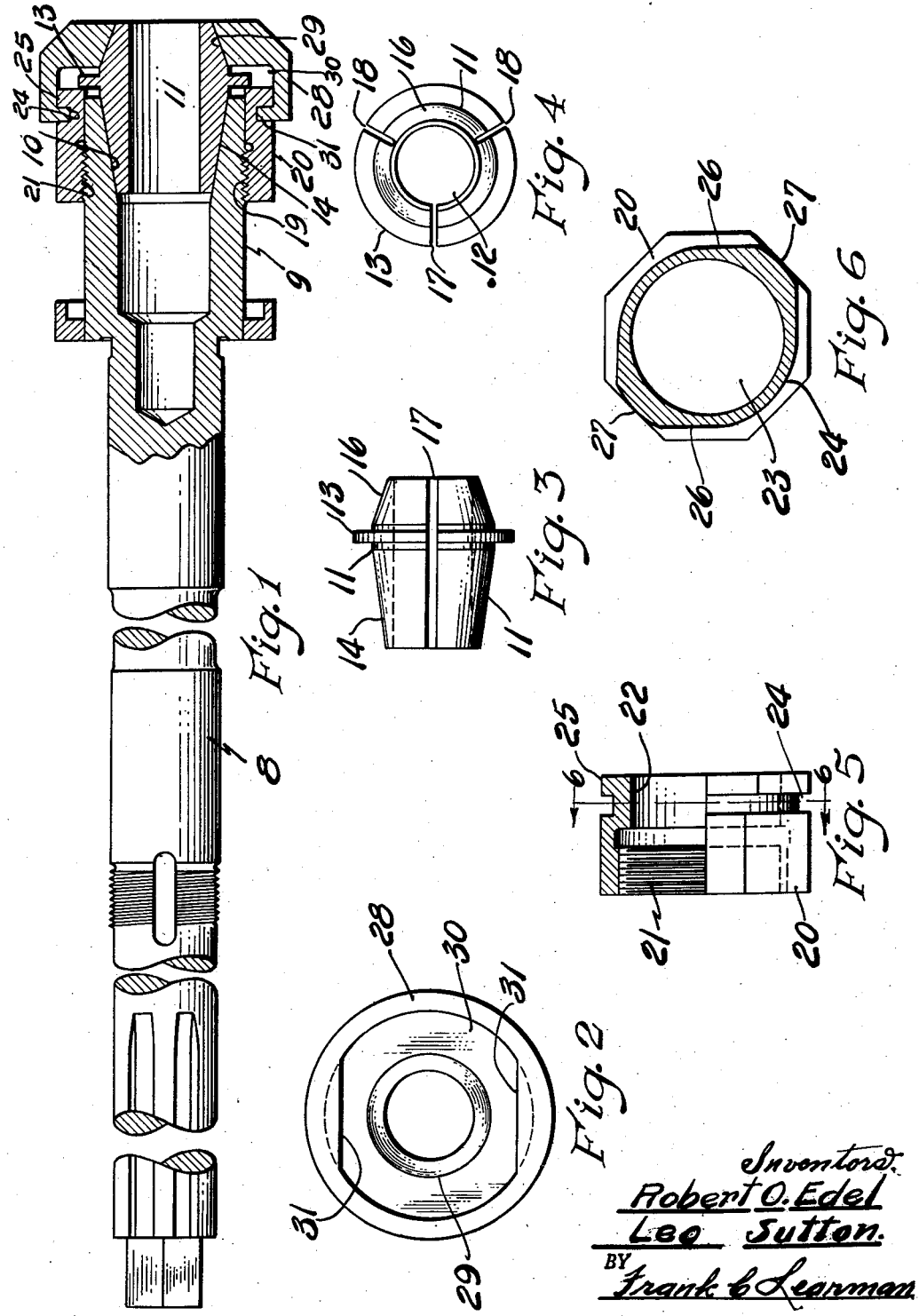
Inventors:
Robert O. Edel
Lee Sutton.
BY Frank C. Leanman
ATTORNEY Patented Sept. 21, 1948

2,449,887

UNITED STATES PATENT OFFICE 2,449,887

COLLET CHUCK

Robert O. Edel, Frankenmuth, and Leo Sutton, Bridgeport, Mich.

Application September 16, 1946, Serial No. 697,304

6 Claims. (Cl. 279—49)

This invention relates to collet chucks, and more particularly to a chuck such as employed in connection with milling machines, turret lathes, profiles and with automatic machines of all kinds.

One of the prime objects of the invention is to design an easy and quickly operable chuck in which set screws and/or similar securing means is eliminated.

Another object is to provide a chuck composed of few simple parts, all of sturdy construction, so that frequent breakage and damage is eliminated.

A further object is to provide a chuck in which the tool is firmly gripped, and from which it can be quickly and easily removed and/or rejected.

A further object is to design a chuck in which a tool can be very quickly and easily locked and/or unlocked, and in which the clamping member and nut are designed to interlock when the clamping member is rotated through a limited predetermined arc.

With the above and other objects in view, the present invention consists in the combination and arrangement of parts, hereinafter more fully described, illustrated in the acompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a side-elevational, part-sectional view of the chuck assembly embodying our improved construction.

Fig. 2 is an end-elevational view of the clamping member.

Fig. 3 is a detail, side-elevational view of the work-gripping collet.

Fig. 4 is an end-elevational view thereof.

Fig. 5 is a part-sectional, side-elevational view of the securing means.

Fig. 6 is a transverse-sectional view taken on the line 6—6 of Fig. 5.

Referring now more specifically to the drawing in which we have shown the preferred embodiment of our invention. The spindle portion of the mechanism can be of any desired design for the purpose required, and in the present instance and for the purpose of illustration, we have shown a shank 8 having an enlarged portion 9 on the lower end thereof and in which the locking mechanism is carried.

The lower end 9 of the spindle 8 is formed with a centrally disposed tapered bore 10 which accommodates a work gripping collet 11 formed as clearly shown in Figs. 1, 3 and 4 of the drawing, said collet being centrally bored as at 12, and is formed with a transversely disposed rib 13 at a point intermediate its length, the outer surface of the inner end section of the collet being tapered as at 14 to conform to the tapered section 10 of the spindle, while the outer end 16 is tapered in the opposite direction, and for a purpose to be presently described.

The collet 11 is longitudinally slit on the line 17, and circumferentially spaced grooves 18 are provided in the body to provide the necessary springiness and resiliency so that it may be contracted to rigidly clamp a tool (not shown).

A threaded section 19 is provided on the shouldered end 9 of the spindle, and a nut 20 has threaded engagement therewith, said nut being of special design, the section 21 of the nut being threaded, while the remainder 22 of the bore is smooth. The upper end of the nut is shaped to facilitate engagement by a wrench (not shown) while the remainder of the nut is smooth as shown.

A grove 24 is provided in the outer end section of the nut directly adjacent the end thereof and forms a rib 25, said rib being cut away as shown to provide diametrically opposed flat sections 26 with stops 27 adjacent thereto, the ends of the sections opening into the groove 24.

A clamping member 28 fits over the tapered end 16 of the collet, the outer end of said member being formed with a centrally disposed tapered bore 29 to fit the tapered end 16 of the collet, the inner end having an enlarged bore 30, and inwardly projecting overhanging flanges or wings 31 are formed integral with and on the inner end of the clamping member for engagement in the grooves 24 when the parts are in assembled position, these flanges being fitted over the flat sections 26 of the nut, and slight rotation of the clamping member in a counter-clockwise direction serves to lock it in position.

To assemble, the nut 20 is first threaded on the end 9 of the shank and the collet 11 inserted in the bore 10, the clamping member 28 is placed on the end of the nut, so that the flanges are in circumferential alignment with the grooves 24, after which the clamping member is rotated in a counterclockwise direction as above explained; the nut 20 is then rotated in a clockwise direction to force the clamping member tight on the collet, and this tends to squeeze the collet on both tapered surfaces to firmly grip the tool (not shown).

To release, it is merely necessary to reverse the procedure above-described, the operator first rotates the nut about one half turn; he then rotates clamping member 28 in the opposite direction to bring the flanges 31 into alignment with the flat sections 26, and the clamping member and collet structure can then be disengaged.

From the foregoing description, it will be clearly obvious that we have perfected a very simple, practical and inexpensive collet chuck for automatic machines of all kinds.

What we claim is:

1. A collet chuck comprising a threaded shank having a tapered bore in the lower end thereof, a nut threaded on said shank and formed with a circumferential groove, opposed flatted sections on said nut flush with the bottom wall of said groove, a circumferentially contractable collet mounted in said tapered bore and formed with a rib intermediate its length, said collet being tapered in opposite directions from said rib, a clamping member piloted on the outer tapered end of the collet, and formed with inwardly projecting flanges adapted to slide over said flatted sections, said member being rotatable into locked engagement with said groove, said nut and member being rotatable as a unit for exerting collapsible pressure on said collet.

2. The combination as defined in claim 1 in which the clamping member is bored to accommodate the lower end of the nut, and a tapered bore in the outer end wall of the clamping member to accommodate the tapered lower end of said collet.

3. The combination as defined in claim 1 in which the circumferential groove is located directly adjacent the lower end of the nut, and stops in said grooves for preventing rotation of the clamping nut in more than one direction.

4. A collet chuck of the class described comprising, a shank having a threaded section on its lower end and formed with a central tapered bore, a nut having threaded engagement with said threaded section and formed with a groove directly adjacent the lower end thereof and forming a rib thereat, flatted sections on said rib and forming entrances to said groove, a collapsible collet formed with a transversely disposed rib, opposed tapered end sections on said collet, one section being mounted in said shank bore, a clamping member piloted on the outer end of said collet and formed with inwardly projecting wings on the inner end thereof for engagement with said groove when the clamping member is rotated in a counter-clockwise direction, said nut and member being rotatable as a unit in a clockwise direction for exerting collapsible pressure on said collet.

5. The combination as defined in claim 4 in which the upper end of the nut is shaped for engagement by a wrench, with the lower end cylindrical and formed with diametrically opposed flatted sections forming entrances to said groove, and inwardly projecting wings on the inner end of the clamping member for engagement in said groove.

6. A collet chuck comprising a threaded shank having a tapered bore, a nut threaded on said shank, a circumferentially contractable collet mounted in said tapered bore and formed with a rib intermediate its length, said collet being tapered in opposite directions from said rib, a clamping member piloted on the outer tapered end of the collet and releasably engageable with said nut, said nut and clamping member being rotatable as a unit for exerting collapsible pressure on said collet.

ROBERT O. EDEL.
LEO SUTTON.

REFERENCES CITED

The following references are of record in the file of this patent:

UNITED STATES PATENTS

| Number | Name | Date |
|---|---|---|
| 386,262 | Pedersen | July 17, 1888 |
| 493,231 | Muir | Mar. 7, 1893 |
| 2,358,299 | Benjamin et al. | Sept. 19, 1944 |

FOREIGN PATENTS

| Number | Country | Date |
|---|---|---|
| 104,289 | Australia | 1938 |